United States Patent [19]

vanden Berg et al.

[11] 4,107,814
[45] Aug. 22, 1978

[54] WINDSHIELD WIPER CONSTRUCTION

[75] Inventors: Johan H. vanden Berg; Alex H. van Eekelen, both of Hasselt; Albert G. Hoebrechts, Mechelen-Bovelingen, all of Belgium

[73] Assignee: Monroe Auto Equipment Company, Monroe, Mich.

[21] Appl. No.: 715,993

[22] Filed: Aug. 19, 1976

Related U.S. Application Data

[62] Division of Ser. No. 438,038, Jan. 30, 1974, Pat. No. 3,978,544.

[51] Int. Cl.² .................... A47I 1/00; B60S 1/02
[52] U.S. Cl. .................................................. 15/250.42
[58] Field of Search ............ 15/250.42, 250.36, 250.4, 15/250.41

[56] References Cited

U.S. PATENT DOCUMENTS

| | | | |
|---|---|---|---|
| 3,131,414 | 5/1964 | Wise | 15/250.42 |
| 3,176,337 | 4/1965 | Glynn | 15/250.42 |
| 3,177,514 | 4/1965 | Wise | 15/250.42 |
| 3,606,630 | 9/1971 | Haas | 15/250.36 |

*Primary Examiner*—Robert W. Jenkins
*Attorney, Agent, or Firm*—Harness, Dickey & Pierce

[57] ABSTRACT

A windshield wiper construction adapted to provide for longitudinal sliding or shifting movement between the wiper element and associated flexor member relative to the associated superstructure and wiper arm, whereby to accommodate for variations in windshield curvature. The construction may be fabricated of a one-piece monolythic structure, thereby obviating the need for various connecting links and the like which have been utilized in the prior art and thus simplifying the fabrication, construction and assembly time and expenses to the extreme.

1 Claim, 23 Drawing Figures

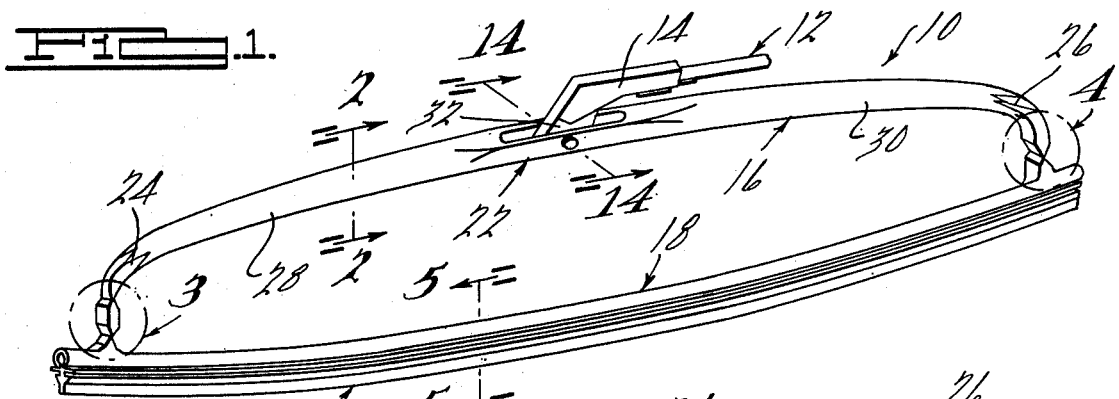
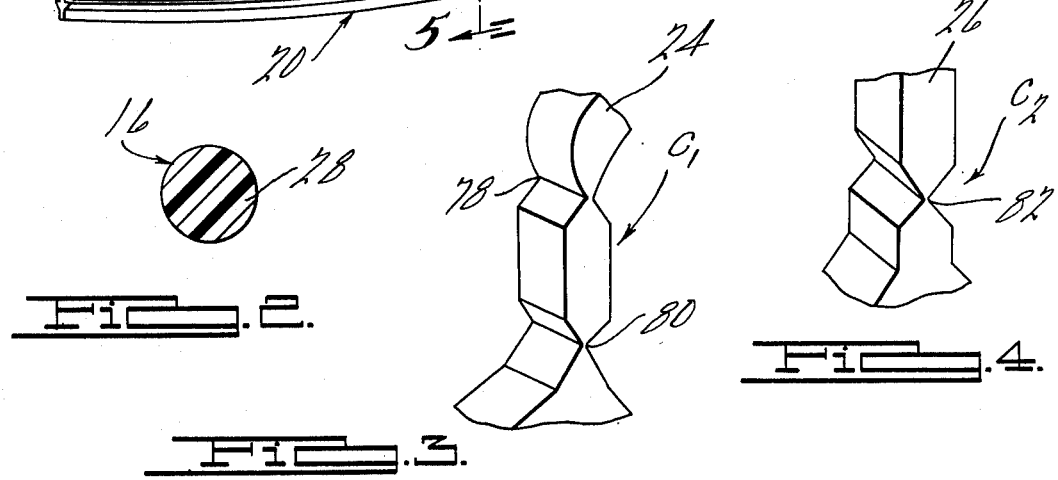
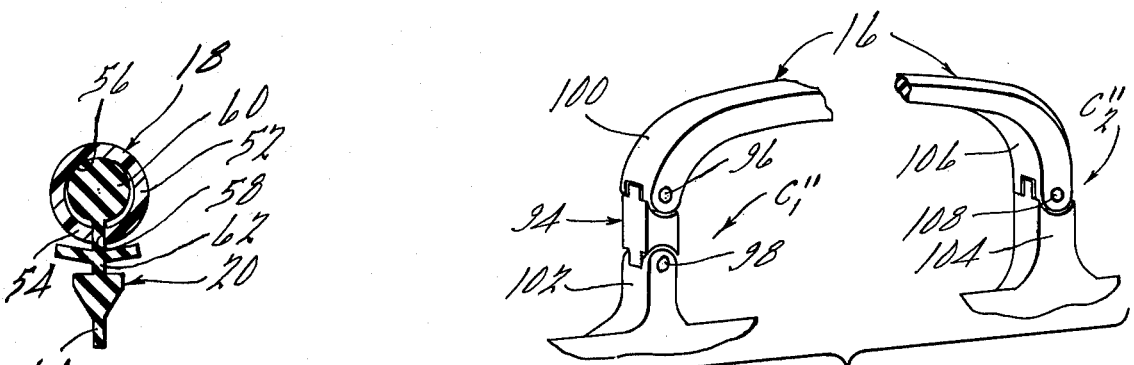
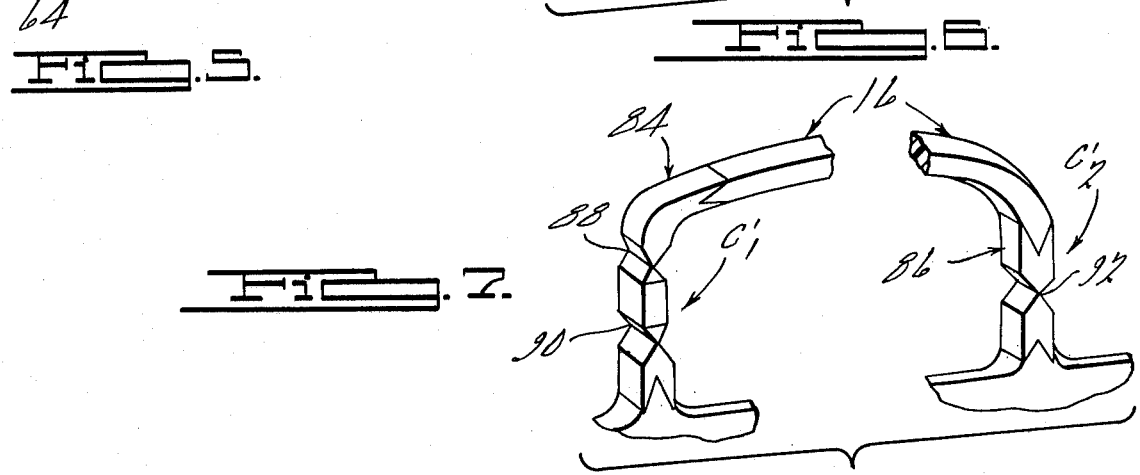

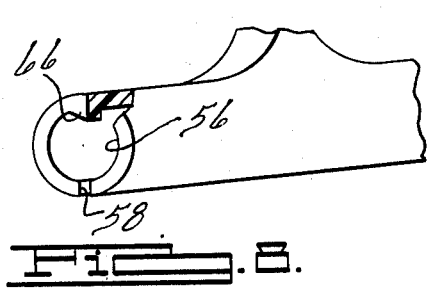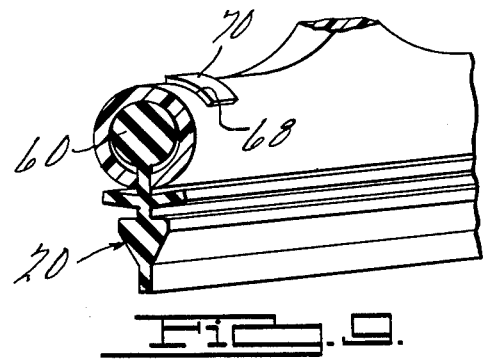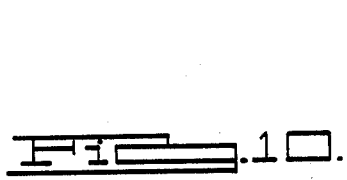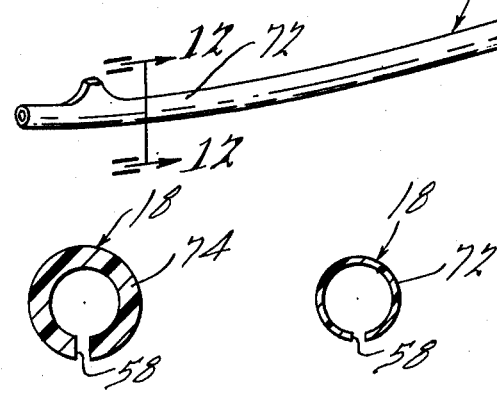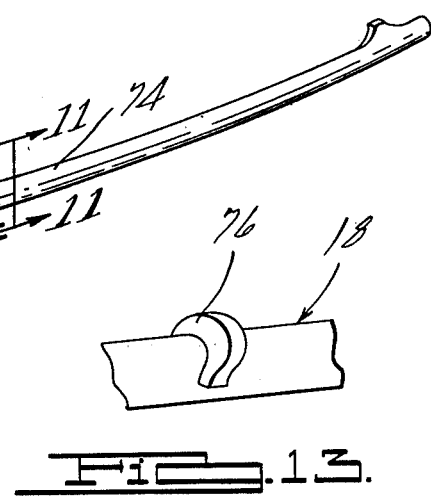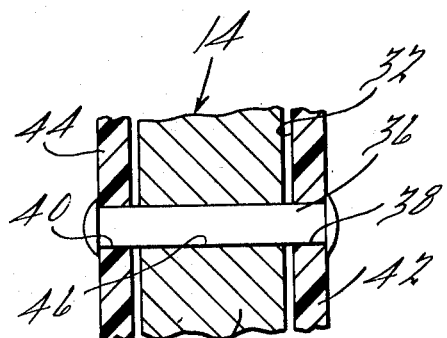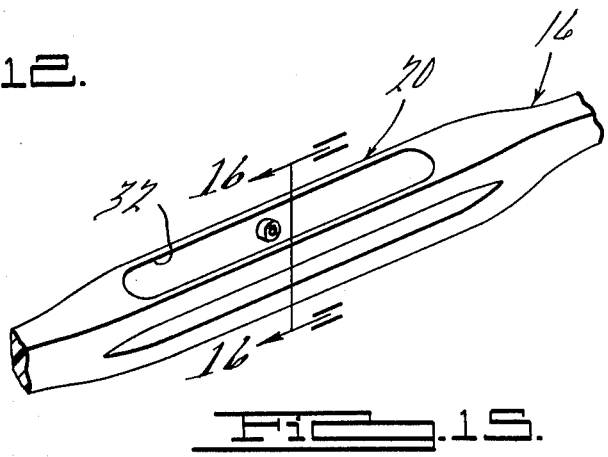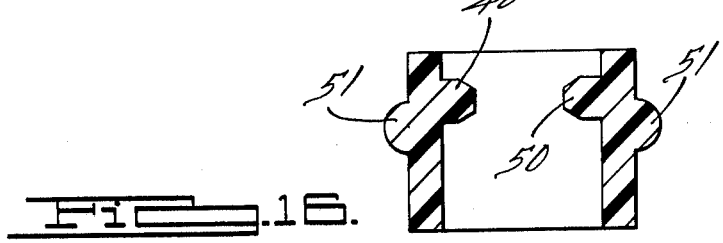

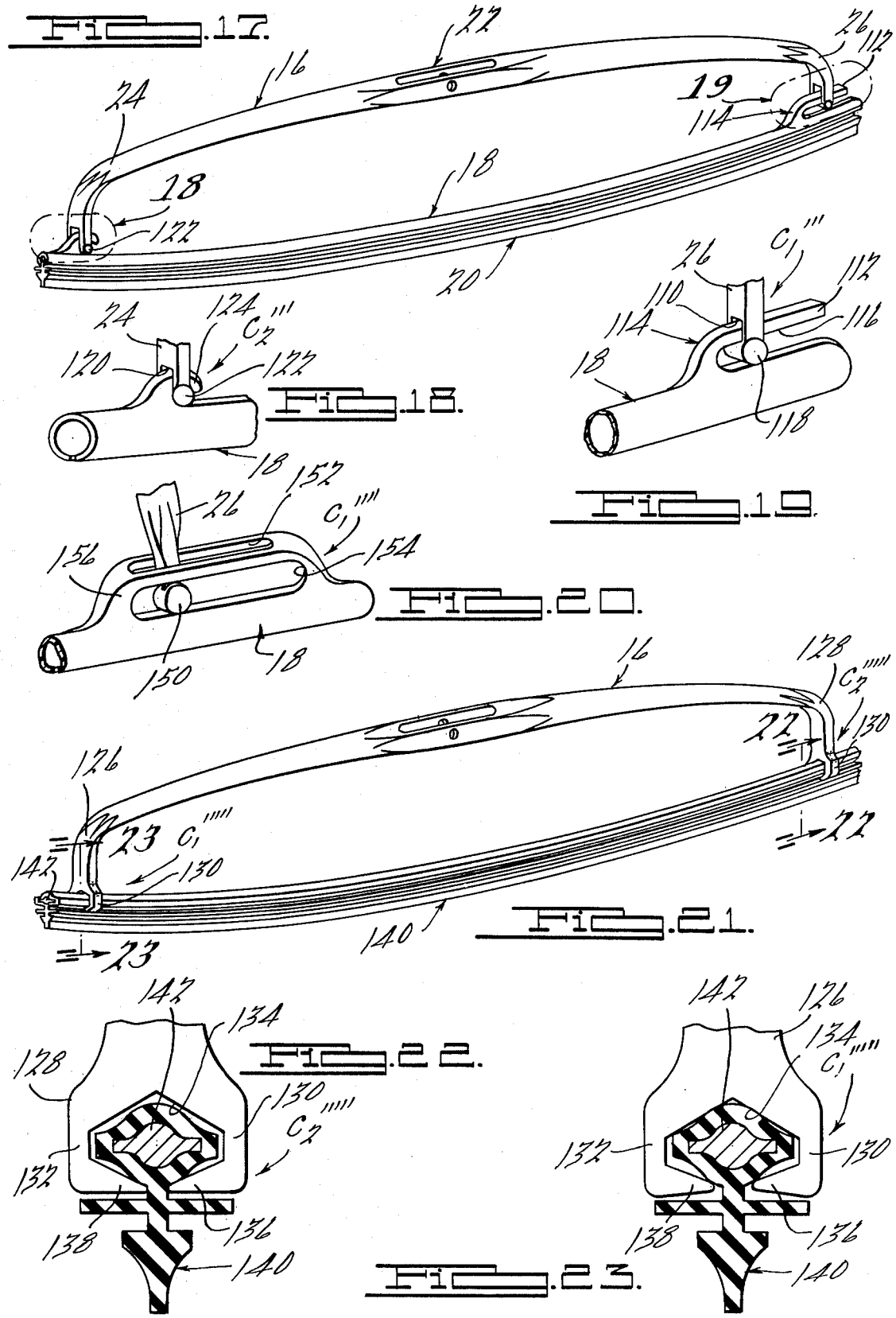

WINDSHIELD WIPER CONSTRUCTION

This is a division, of application Ser. No. 438,038, filed Jan. 30, 1974, now U.S. Pat. No. 3,978,544.

SUMMARY OF THE INVENTION

This invention relates generally to windshield wiper constructions and more particularly, to a new and improved blade assembly which minimizes to the extreme the number of component parts.

It has heretofore been the practice in the construction of vehicular windshield wiper blade assemblies to utilize one or more connecting links between the bridge member and associated flexor member in order to achieve uniform pressure distribution along the rubber wiping element; however, the provision of such links are objectionable from a cost standpoint and in many designs, such links are ineffective in providing the optimum pressure distribution.

The present invention is directed toward a new and improved wiper blade construction which is designed to obviate the need for such connecting links yet achieve the desired pressure distribution along the entire length of the wiper element, whereby to assure for effective moisture removal. As will hereinafter be described in detail, the wiper blade assembly of the present invention may, if desired, be fabricated of a one-piece monolythic structure so as to simplify to the extreme the manufacturing and assembly procedures involved. In addition, one feature of the present invention resides in the fact that lateral shifting movement is provided between the flexor element and associated wiper element relative to the bridge structure which is connected to the wiper arm, thus providing for contiguous engagement of the wiper element with associated windshields regardless of the degree of curvature thereof. Such lateral shifting movement may be provided by various hinge and/or pivotal connections depending upon the desired constructional characteristics of the blade assembly.

It is accordingly a general object of the present invention to provide a new and improved windshield wiper blade assembly.

It is a more particular object of the present invention to provide a new and improved windshield wiper blade assembly which is adapted to accommodate for windshields of varying curvature through the provision of means enabling lateral shifting movement of the wiper element relative to the associated bridge structure.

It is another object of the present invention to provide a new and improved windshield wiper construction wherein the flexor and bridge sections may be integrally connected to one another, and wherein the flexor section may be formed with a positive bow in order to provide for uniform pressure distribution.

It is another object of the present invention to provide a new and improved windshield wiper blade assembly which has superior anti-windlift characteristics as compared to prior art designs.

It is still another object of the present invention to provide a new and improved windshield wiper blade construction which is of a relatively simple design, is economical to manufacture and will have a long and effective operational life.

Other objects and advantages of the present invention will become apparent from the following description taken in conjunction with the accompanying drawings.

BRIEF DESCRIPTION OF THE DRAWINGS

FIG. 1 is an elevated perspective view of one preferred embodiment of the present invention;

FIG. 2 is an enlarged cross-sectional view taken substantially along the line 2—2 of FIG. 1;

FIG. 3 is an enlarged fragmentary view of the portion of the structure shown within the circle 3 of FIG. 1;

FIG. 4 is an enlarged fragmentary view of the portion of the structure shown within the circle 4 of FIG. 1;

FIG. 5 is an enlarged cross-sectional view taken substantially along the line 5—5 of FIG. 1;

FIG. 6 is an enlarged fragmentary elevated perspective view of an alternate embodiment of the present invention;

FIG. 7 is a view similar to FIG. 6 and illustrates yet another embodiment of the present invention;

FIG. 8 is an enlarged fragmentary view, partially broken away, illustrating one end of the flexor section incorporated in the wiper blade assembly of the present invention;

FIG. 9 is a view similar to FIG. 8 and illustrates yet another embodiment of the present invention;

FIG. 10 is an elevated perspective view, partially broken away, of another embodiment of the flexor section of the present invention;

FIGS. 11 and 12 are enlarged cross-sectional views taken substantially along the lines 11—11 and 12—12, respectively, of FIG. 10;

FIG. 13 is an enlarged elevated perspective view of an alternate construction of the flexor element of the present invention;

FIG. 14 is an enlarged fragmentary cross-sectional view taken substantially along the line 14—14 of FIG. 1;

FIG. 15 is an enlarged fragmentary perspective view of an alternate construction of the bridge section of the windshield wiper blade assembly of the present invention;

FIG. 16 is an enlarged fragmentary view taken substantially along the line 16—16 of FIG. 15;

FIG. 17 is an elevated perspective view of yet another embodiment of the windshield wiper construction of the present invention;

FIG. 18 is an enlarged elevated perspective view of a portion of the structure shown within the circle 18 of FIG. 17;

FIG. 19 is an enlarged elevated perspective view of a portion of the structure shown within the circle 19 of FIG. 17;

FIG. 20 is a view similar to FIG. 19 and illustrates yet another embodiment of the present invention;

FIG. 21 is an elevated perspective view of yet a further embodiment of the windshield wiper construction of the present invention;

FIG. 22 is an enlarged fragmentary cross-sectional view taken substantially along the line 22—22 of FIG. 21; and FIG. 23 is a view similar to FIG. 22 taken substantially along the line 23—23 of FIG. 21.

DETAILED DESCRIPTION OF THE PREFERRED EMBODIMENTS

Referring now in detail to the drawings and in particular to FIG. 1 thereof, a windshield wiper assembly 10, in accordance with one preferred embodiment of the present invention, is shown in operative association with the outer end of a windshield wiper arm 12 having an end fitting 14 mounted on the outer end thereof and adapted to be detachably secured to the assembly 10. Generally speaking, the assembly 10 comprises a bridge structure or section 16 that is connected at the opposite ends thereof to a flexor section 18 which functions to operatively carry an elongated wiper element 20. As will be appreciated by those skilled in the art, upon pivotal or swinging movement of the wiper arm 12, the assembly 10 is adapted to be biased concomitantly across a windshield surface or the like, whereby to remove excessive moisture therefrom.

In accordance with one feature of the present invention, the flexor and bridge sections 18 and 16, respectively, are of a one-piece monolythic molded construction, with the bridge section 16 comprising a central portion 22 and opposed end portions 24 and 26. The end portions 24, 26 are provided with connecting means $C_1$ and $C_2$, respectively, which function to operatively connect the bridge section 16 to the flexor section 18 and provide for selected movement therebetween in a manner to be hereinafter described. The portions of the bridge section 16 intermediate the central portion 22 and end portions 24, 26, herein designated by the numerals 28 and 30, are preferably of a generally circular shape, as best seen in FIG. 2, whereby to enhance the anti-windlift characteristics of the wiper assembly 10 of the present invention. The central portion 22 is formed with an opening 32 which is of an elongated configuration and extends entirely through the portion 22. The opening 32 is adapted to removably receive a reduced thickness portion 34 of the end fitting 14 on the wiper arm 12 in a manner best seen in FIGS. 1 and 14. Means for operatively securing the assembly 10 to the end fitting 14 is provided by a pivot pin or the like 36 which extends through aligned bores 38 and 40 formed in reduced thickness side portions 42 and 44 of the portion 22, the pin 36 also extending through a bore or opening 46 formed in the end fitting 14 and aligned with the bore 38, 40, whereby to provide for relative pivotal movement of the assembly 10 on the outer end of the wiper arm 12 so that the wiper element 20 may conform with the surface of the windshield upon relative pivotal movement of the arm 12. A slightly modified embodiment of the present invention is shown in FIGS. 15 and 16 wherein the side portions 42, 44 of the bridge section 16 are formed with a pair of laterally inwardly projecting aligned bosses or shoulders 48 and 50 which are of a generally circular cylindrical configuration and are adapted to be removably received within the opposite ends of the bore 46 formed in the end fitting 14. By virtue of the relatively flexible characteristics of the material from which the assembly consisting of the bridge and flexor sections is fabricated, the side portions 42, 44 may be temporarily biased outwardly whereby to provide for insertion of the reduced thickness portion 34 of the end fitting 14 and hence operative insertion of the bosses 48, 50 within the ends of the bore 46. If desired, suitable integral reinforcing ribs 51 may be provided on the outer sides of the side portions 42, 44 in order to provide for the requisite structural integrity and rigidity of the bridge section 16 and assure against inadvertent disassembly of the bosses 48, 50 from within the associated bore 46 of the wiper arm end fitting 14.

Referring now in detail to the construction of the flexor section 18 of the assembly 10, in accordance with another inventive feature of the present invention, said section 18 comprises an elongated hollow tubular body 52 which includes a circular side wall 54 defining a longitudinally extending central cavity 56. The side of the tubular body 52 opposite the bridge section 16 is formed with an elongated slot which is coextensive of the side wall 54 and communicates at the inner side thereof with the cavity 56. The cavity 56 is adapted to removably receive a generally cylindrically-shaped mounting section 60 which extends along the entire length and is formed integrally of the wiper element 20. As will be appreciated by those skilled in the art, the element 20 is fabricated of a resilient deformable material, such as rubber or the like, and includes a neck portion 62 which, as seen in FIG. 5, extends downwardly from the mounting section 60 and functions to operatively connect the mounting section 60 to a windshield engaging wiping lip section 64. The neck portion 62 is slightly smaller in cross-sectional size than the slot 58, whereby to permit the wiper element 20 to be inserted longitudinally into the flexor section 18 from one end thereof, resulting in the wiping lip section 64 depending outwardly from the bridge section 16, as best seen in FIG. 5. If desired, suitable means may be provided at the ends of the flexor section 18 for releasably retaining the wiping element 20 within the cavity 56, such as a radially inwardly extending shoulder or the like 66 formed at one end of the flexor section 18, as best seen in FIG. 8. In addition, or alternatively, the circular side wall 54 may be provided with an opening 68, as shown in FIG. 9, adapted to removably receive a suitable outwardly projecting boss portion or the like 70 formed integrally of the wiper element 20 and adapted to be snapped into the opening 70 upon operative installation of the wiper element 20 into the flexor section 18.

As previously mentioned, the assembly consisting of the bridge section 16 and flexor section 18 may be of a one-piece monolythic construction preferably fabricated, as by injection molding or the like, of a suitable polymeric plastic material having the requisite flexible characteristics to assure for positive contiguous engagement of the wiper element 20 with the associated windshield. In accordance with the present invention, it is contemplated that the flexor section 18 be fabricated in a manner so as to assume a relatively arcuate configuration which is known in the art as a positive bow, whereupon operative mounting of the blade assembly 10, the force of the wiper arm 12 toward the associated windshield will be transmitted via the bridge section 16 to the outer ends of the flexor section 18 and cause the wiper element 20 to exert a relatively uniform force against the surface of the associated windshield. By fabricating the flexor section 18 by means of an injection or other type of molding operation, the desired degree of positive bow may be easily achieved by properly designing the associated mold, as will be appreciated by those skilled in the art.

In accordance with another construction of the present invention, it is contemplated that the wall thickness of the circular side wall 54 of the flexor section 18 may be of varying thickness whereby to selectively control the degree of flexibility of the flexor section 18. As best seen in FIGS. 10–12, it is contemplated that the portion of the circular wall 54 of the flexor section 18 adjacent the opposite ends thereof will be somewhat thinner, as seen at 72, than the portion of the side wall 54 adjacent the center of the flexor section 18, as indicated at 74. Accordingly, the flexor section 18 will be of a relatively greater flexibility at the outer ends thereof with a gradually decreasing degree of flexibility towards the center thereof, thus optimizing the conformity of the flexor section 18 to the associated windshield surface. Means for varying the degree of flexibility of various longitudinal portions of the flexor section 18 may also be achieved through the provision of reinforcing ribs, as indicated at 76 in FIG. 13, that are formed integrally of the flexor section 18. Such ribs 76 may be spaced longitudinally along the flexor section 18 in order to achieve a greater or lesser degree of flexibility, with the ribs 76 also functioning to assure against separation or opening of the slot 58 which might result in inadvertent disassembly of the wiper elements 20 therefrom when the assembly 10 is moved across a highly frictional surface, such as a relatively dry windshield. It will be noted that the circular cross-sectional shape of the flexor section 18 provides for improved anti-windlift characteristics as compared to prior art flexor designs.

As previously mentioned, in order to achieve optimum conformity to relatively curved windshields, it is desirable to provide for relative longitudinal shifting movement of the flexor section 18 relative to the associated bridge section 16. Such longitudinal shifting movement may be provided in a variety of different ways, one of which is shown in FIGS. 1, 3 and 4 wherein the connecting means $C_1$ and $C_2$ is in the form of a pair of hinge constructions formed integrally of the bridge section 16 and flexor section 18. In particular, the connecting means $C_1$ is formed with a pair of reduced thickness sections 78 and 80 which are intended to permit relative flexing movement between the bridge section 16 and flexor section 18. In a similar manner, the connecting means $C_2$ comprises a reduced thickness section 82 which provides for relative flexing movement between the adjacent end of the flexor section 18 and the end section 26 of the bridge section 16. As will be appreciated by those skilled in the art, the provision of the double reduced thickness sections 78 and 80 of the connecting means $C_1$ permits the bridge section 16 and flexor section 18 to move longitudinally relative to one another so that the wiping element 20 carried by the flexor section 18 may conform to the optimum degree with the associated windshield.

FIG. 7 illustrates a modified construction of the windshield wiper assembly 10 of the present invention wherein the connecting means operatively connecting the opposite ends of the bridge section 16 with the flexor section 18 consists of separate members in the form of connecting means $C_1'$ and $C_2'$, which members are herein designated by the numerals 84 and 86. Members 84 and 85 are adapted to function generally in the same manner as the connecting means $C_1$ and $C_2$ previously described; however, by virtue of being fabricated of a separate material from the remainder of the bridge and flexer sections, such material may be specifically selected so as to have desired flexibility or "hinge" characteristics that may or may not be different from the material from which the flexor and bridge sections are fabricated. The connecting means $C_1'$ includes a pair of reduced thickness sections 88 and 90, while the connecting means $C_2'$ consists of a reduced thickness section 92. The members 84, 86 may be connected by any suitable means to the adjacent ends of the flexor section 18 and bridge section 16, such as by suitable fastening means and/or by being molded thereto during the fabricating operation.

The means for providing for lateral shifting movement of the flexor section 18 relative to the bridge section 16 may be provided by hinged arrangements other than the reduced thickness sections hereinabove described in connection with FIGS. 3, 4 and 7. For example, FIG. 6 illustrates another embodiment of the present invention wherein connecting means $C_1''$ and $C_2''$ function to operatively connect the opposite ends of the bridge section 16 to the flexor section 18. The connecting means $C_1''$ comprises a separate hinge member or element, herein designated by the numeral 94, which is hingedly or pivotably connected via a first pivot pin or the like 96 at one end thereof and by a second suitable pivot pin or the like 98 at the opposite end thereof to adjacent portions 100 and 102, respectively, of the bridge section 16 and flexor section 18. Similarly, the connecting means $C_2''$ operatively connecting the opposite end of the bridge section 16 to the opposite end of the flexor section 18 consists of a pivotable or hinged connection between adjacent portions 104 and 106 of the sections 18 and 16, respectively, which pivotal connection is provided by means of a suitable pivot pin or the like 108 extending through aligned bores in the portions 104, 106.

FIGS. 17-19 illustrate yet another embodiment of the present invention wherein connecting means $C_1'''$ and $C_2'''$ are provided between the opposite ends of the bridge section 16 and the flexor section 18 and function to permit relative longitudinal shifting movement of the flexor section and wiper element 20 carried thereby. In particular, the connecting means $C_1'''$ comprises an aperture 110 formed in the terminal end of the end portion 26 of the bridge section 16, which aperture 110 is adapted to slidingly receive the outer end portion 112 of a generally hook-shaped element 114 integrally formed on the adjacent end of the flexor section 18. The hook section 114 defines an elongated slot 116 within which a generally circular-shaped portion 118 on the end section 26 is adapted to be slidingly disposed. The connecting means $C_2'''$ at the opposite end section 24 includes an aperture 120 which is similar to the aperture 110 and is adapted to cooperate with a generally circular cylindrical portion 122, analogous to the portion 118, receiving a generally hook-shaped section 124 formed on the flexor section 18. The section 124 and aperture 120 are preferably dimensioned so as to provide for a "snap-in" or interference fit, whereby to assure against inadvertent disassembly of the bridge section 16 and flexor section 18. By virtue of the sliding relationship provided by the connecting means $C_1'''$ and the relative pivotal connection provided by the connecting means $C_2'''$, lateral shifting movement of the flexor section 18 may occur.

FIG. 20 illustrates a slightly modified construction of the connecting means $C_1'''$ wherein a connecting means $C_1''''$ is shown as comprising a generally cylindrically-shaped boss portion 150 formed on the terminal end of the end portion 26 of the bridge section 16. The boss portion 150 is adapted to extend through a slot 152 and be disposed within a longitudinally extending guideway 154 defined by an upwardly extending portion 156 formed on the outer end of the flexor section 18 in the same general location as the connecting means $C_1'''$. By virtue of the sliding relationship of the boss portion 150 within the guideway 154, the adjacent end portion 26 of the bridge section 16 may move longitudinally within the guideway 154 and hence provide for longitudinal shifting movement of the flexor section 18 relative to the bridge section 16.

FIGS. 21-23 illustrate still another embodiment of the present invention wherein connecting means $C_1'''''$ and $C_2'''''$ function to operatively connect the opposite ends of the bridge section 16 to the associated ends of the flexor section 18. In the construction shown in FIGS. 21-23, the bridge section 16 is formed with a pair of opposite end portions 126 and 128, each of which end portions 126, 128 is formed with a pair of opposed claws 130 and 132, as best seen in FIGS. 22 and 23. The claws 130, 132 define a recess 134 within which the uppermost portion of the associated wiper element, herein designated by the numeral 140, is adapted to be retained. The claws 130 and 132 are formed with inwardly projecting end portions 136 and 138, respectively, which are adapted to embrace the upper mounting portion of the wiper element 140 which, in the embodiment shown in FIGS. 21-23 is provided with an internal metallic, plastic or other relatively rigid, yet flexible, flexor element, herein designated by the numeral 142. In accordance with the present invention, one of the connecting means $C_1''''''$ or $C_2''''''$ is adapted to be immovably secured to the assemblage consisting of the wiper element 140 and flexor element 142, while the other of said connecting means is adapted to be longitudinally slidably secured to said assemblage. For example, the connecting means $C_1''''''$ may have the end portions 136, 138 of the claws 130, 132 clampingly engaged with the mounting section of the wiper element, as shown in FIG. 23, whereby to immovably secure the wiper element 140 to the end portion 126 of the bridge section 16. The connecting means $C_2''''''$ consists of the end portions 136, 138 of the opposite end claws 130, 132 spaced slightly away from the underside of the mounting portion of the element 140, (see FIG. 22), so as to provide for longitudinal sliding movement of the wiper element 140 within the recess 134 and thus accommodate for variation in windshield curvature or the like so as to assure for optimum wiping contact of the wiping element 140 with the associated windshield.

It will be seen from the foregoing that the present invention provides a novel windshield wiper construction wherein maximum wiping contact is provided between the wiper element and the associated windshield, regardless of the degree of curvature thereof. The wiper blade construction of the present invention will be seen to be a substantial advance over the prior art from a standpoint of minimizing compound parts and thus simplifying construction and assembly, with the result that the windshield wiper construction of the present invention will exhibit substantial economies over comparable devices heretofore known and used.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A one-piece monolythic windshield wiper blade construction comprising, an elongated flexor section adapted to operatively support a wiper element, a bridge section formed integrally of said flexor section and including opposed end portions secured to longitudinally spaced portions of said flexor section and an intermediate portion adapted to be operatively secured to an associated wiper arm or the like, said opposed end portions of said bridge section comprising a first hinge means at one end of said blade construction and second and third hinge means at the opposite end of said blade construction, each of said hinge means comprising first and second pairs of converging surfaces defining a reduced thickness portion arranged at right angles to the length of said blade construction, with one of said surfaces of each of said pair thereof lying substantially within a first imaginary plane and the other of said surfaces of each of said pair thereof lying substantially within a second imaginary plane, said first and second imaginary planes intesecting along a line colinear of the hinge axis of the associated of said hinge means.

* * * * *